April 5, 1938.                C. J. HUG                2,112,962
                    PNEUMATIC STEERING DEVICE
                      Filed Nov. 2, 1936            3 Sheets-Sheet 1

INVENTOR.
CHRISTIAN J. HUG,
BY Harry J. Benner
                ATTORNEY.

April 5, 1938.   C. J. HUG   2,112,962
PNEUMATIC STEERING DEVICE
Filed Nov. 2, 1936   3 Sheets-Sheet 2
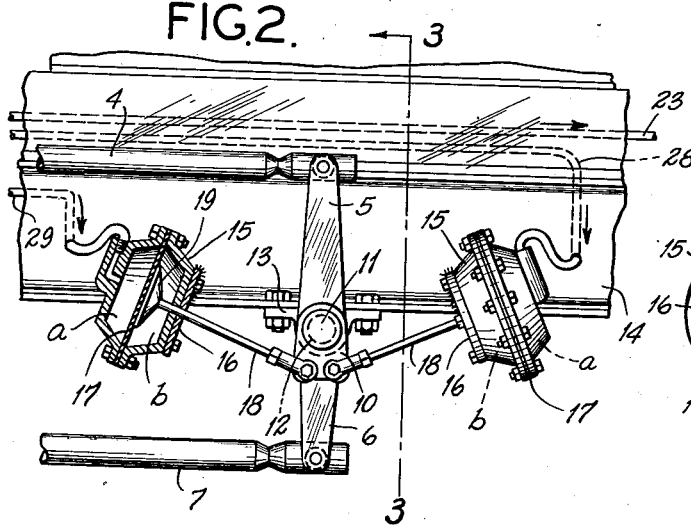
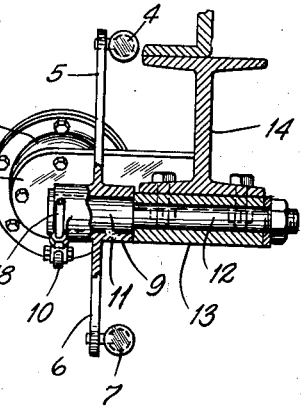
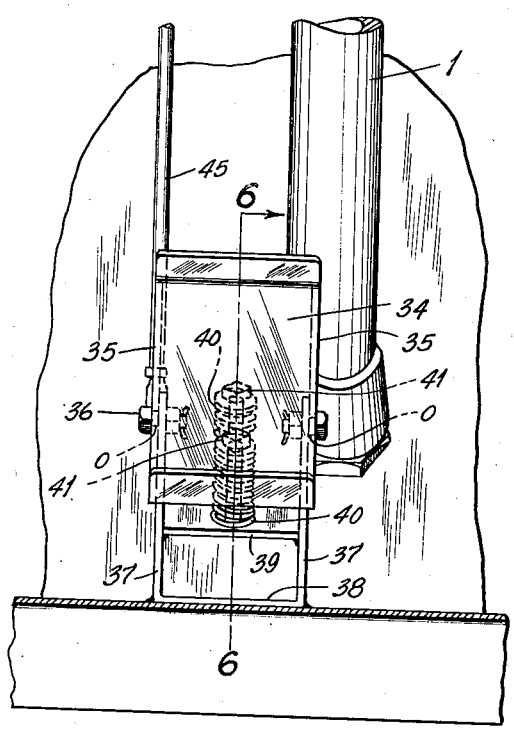
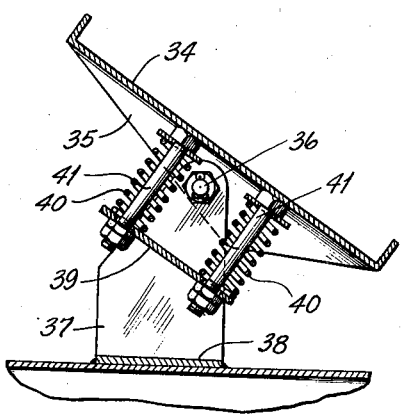
INVENTOR:
CHRISTIAN J. HUG,
By Harry A. Benner
ATTORNEY April 5, 1938.  C. J. HUG  2,112,962
PNEUMATIC STEERING DEVICE
Filed Nov. 2, 1936   3 Sheets-Sheet 3

INVENTOR:
CHRISTIAN J. HUG,
By Harry A. Beimes
ATTORNEY.

Patented Apr. 5, 1938

2,112,962

UNITED STATES PATENT OFFICE 2,112,962

PNEUMATIC STEERING DEVICE

Christian J. Hug, Highland, Ill.

Application November 2, 1936, Serial No. 108,720

3 Claims. (Cl. 180—79.2)

My invention has relation to improvements in steering devices for motor vehicles, especially trucks, and it consists in the novel features of construction more fully set forth in the specification and pointed out in the claims.

The invention is primarily concerned with a pneumatic steering device as an auxiliary to the customary steering apparatus controlled from the steering wheel by manual operation of the driver; and it has for its principal object the interposing of pneumatically operated connections between the steering wheel and the front wheels of the vehicle which may be either pedally or manually actuated by the driver to assist him in the steering of the vehicle.

A further object of the invention is to apply such pneumatic mechanism to the standard connections associated with the steering wheel so as to avoid unnecessary multiplicity of parts, and at the same time maintain a simple, durable and efficient apparatus.

Figure 1:
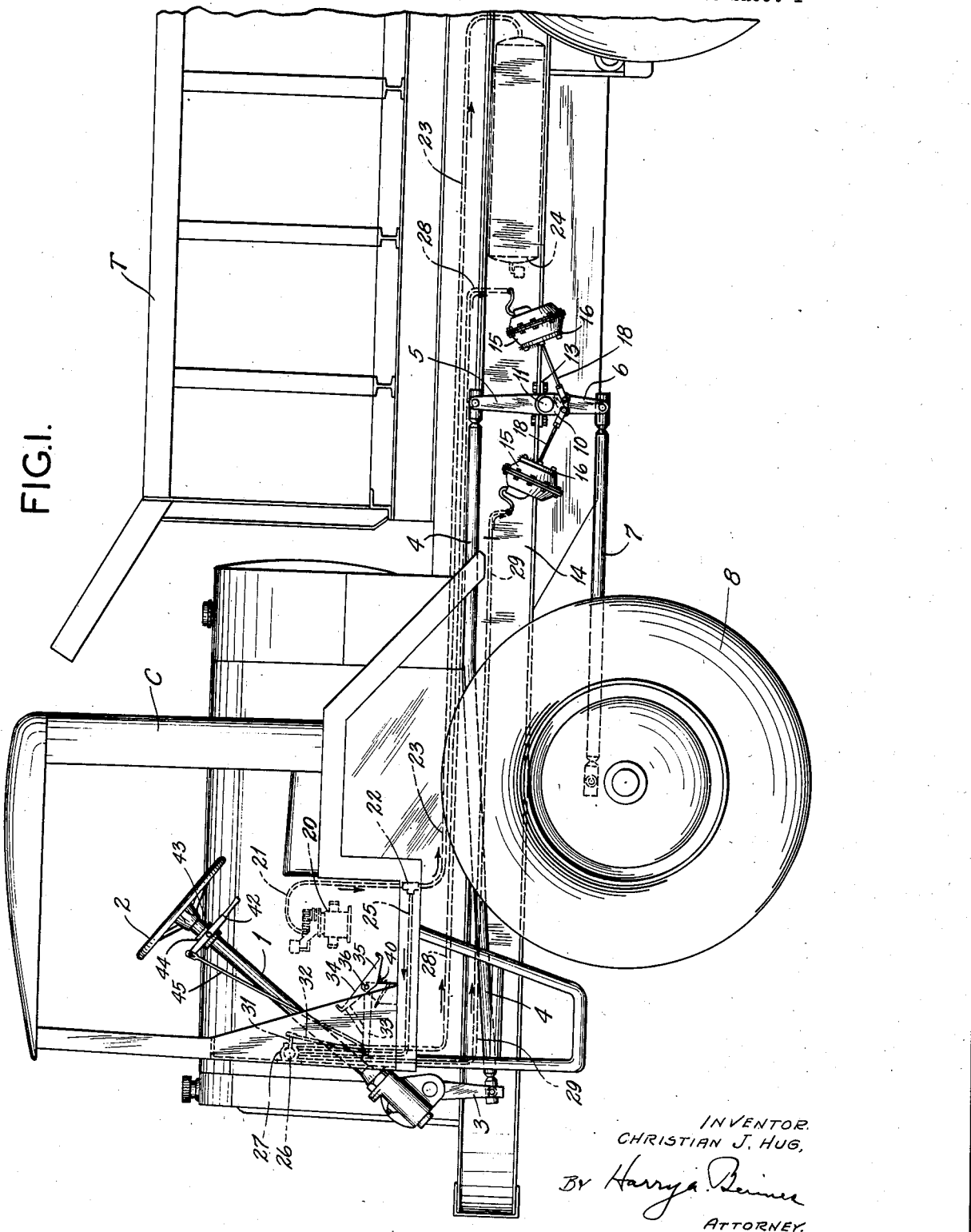

These objects, as well as others inherent in the invention, will be better apparent from a detailed description thereof in connection with the accompanying drawings, in which:

Figure 1 is a side elevation of a truck (with rear end broken away) showing my invention applied thereto; Fig. 2 is an enlarged side elevation of that part of the standard steering mechanism, together with the air cylinders applied thereto for obtaining pneumatic operation of the steering.

Figures 4, 7:
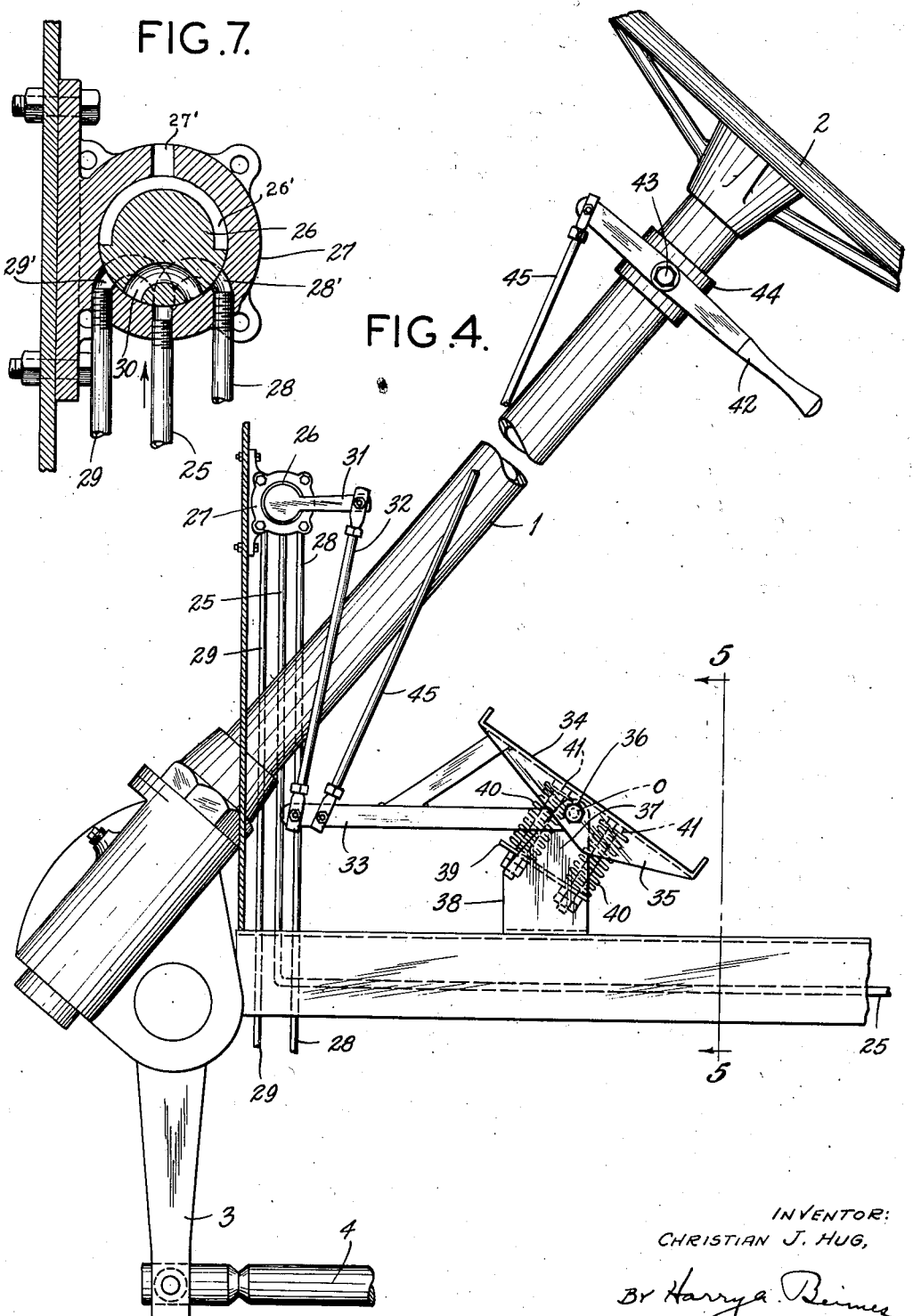

Figure 3 is a cross sectional detail taken on the line 3—3 of Fig. 2; Fig. 4 is an enlarged side elevation of the steering staff and a fragment of the steering wheel mounted thereon, together with the control lever, control pedal and valve of the pneumatic steering apparatus; Fig. 5 is a vertical sectional detail taken on the line 5—5 of Fig. 4 showing pedal for controlling the pneumatic steering in front elevation; Fig. 6 is a vertical cross sectional detail taken on the line 6—6 of Fig. 5; and Fig. 7 is a cross sectional detail through the control valve for the pneumatic steering.

Referring to the drawings, T represents a truck in the cab C of which is the usual steering staff 1, on the upper end of which is a steering wheel 2 and at the lower end of which is a steering arm 3. The steering arm 3 is connected by means of a rearwardly extending rod 4 to the upper arm 5 of a double lever, the lower arm 6 of which is connected by a steering rod 7 to a front wheel 8. These steering connections are old in the art and form a part of the present invention only in so far as the pneumatic mechanism is associated with them.

In the present instance, the lever comprising the arms 5 and 6, projecting from the hub 9, has formed integrally with it a short lever 10 (which also projects from the hub 9) so that the lever will oscillate in unison with the lever arms 5 and 6.

The hub 9 of said lever arms is mounted for rotation on the projecting portion 11 of a pin 12 carried by a housing 13 bolted or otherwise secured to the flanges of one of the frame members 14 of the truck T. Similar cylinders 15, 15 are mounted upon brackets 16, 16 projecting from and fixed to the frame member 14 and within each cylinder is an elastic diaphragm 17 which divides the cylinder into two compartments $a$ and $b$. A connecting rod 18 traverses the cylinder 15 and has a mushroom head 19 in contact with the diaphragm 17. The outer ends of connecting rods 18, 18 are pivotally connected to the short lever 10 so that the rods 18, 18 and said lever 10 will operate in unison. An air compressor 20 is mounted adjacent to the engine and is driven therefrom. The driving connections are not shown as this practice is a common expedient in the art. A tube 21 leads from the high pressure side of the air compressor to a T 22, one branch of the T being connected by a tube 23 to an air reservoir 24 and the other branch of the T 22 being connected by a tube 25 to a rotary valve 26 mounted in valve casing 27. There are two tubes, 28 and 29, leading from the valve 26 by means of short ports 28' and 29', respectively, and leading to the air chambers $a$ of their respective cylinders 15. The valve 26 is provided with a port 30 so arranged that when the valve is rotated in one direction, tube 25 will be connected with tube 28; and when the valve is rotated in the opposite direction, tube 25 will be connected with tube 29. Obviously, in between these two positions neither tube 28 nor tube 29 will be connected with tube 25 and the valve will be closed. The valve 26 is also provided with an exhaust port 26' communicating with port 27' in casing 27 so that when pressure is applied to one of the cylinders 15, the air may exhaust from the other cylinder through ports 26' and 27'.

The valve has an operating lever 31 projecting in a horizontal position when the valve is closed, the outer end of said lever being connected by a rod 32 to a strut 33, forming a part of valve operating pedal 34. The pedal 34 has inwardly extending lateral flanges 35, 35 which have aligning openings o, o so that the pedal may be pivotally connected by means of bolts 36, 36 to side members 37, 37 of a U-shaped bracket 38. A plate 39 is welded or otherwise fixed between the side members 37, 37 of bracket 38 in an inclined position so as to be parallel with the pedal 34 when said pedal is in its position of rest with the control valve 26 closed, and a pair of coiled springs 40, 40 are mounted over bolts 41, 41 on opposite sides of the pivotal axis of the pedal 34. The springs 40, 40 are always under compression and since their lower ends bear against the plate 39, they serve to hold the pedal 34 in its intermediate or at rest position. Irrespective of which way the pedal 34 is rocked, one of the springs will be compressed and the other will expand so that just as soon as the pressure is removed from the pedal, the springs will equalize and restore the pedal to the position shown in Fig. 6. This is important since this position of the pedal insures the closing of the control valve 26.

The valve 26 may also be manually controlled by means of a hand lever 42 pivotally mounted by means of a bolt 43 on a collar 44 fixed to the steering staff 1, the front end of lever 42 being connected to the strut 33 by means of a rod 45 so that upon rocking the lever 42, the strut 33 and pedal 34 will also be rocked to actuate the control valve lever 34 and open the valve to admit air either to tube 28 or tube 29.

By this time it should be obvious that when the valve 26 is operated to admit air from the reservoir or compressor to the tube 28, the right hand cylinder 15 will actuate the short lever 10, together with the lever arms 5 and 6, to steer the truck in one direction; while on the other hand, when air is admitted to the tube 29, the left hand cylinder 15 will actuate the lever 10 so as to steer the truck in the opposite direction.

My improved pneumatic steering device is not intended to completely steer the truck of itself but is merely to assist in the manual steering under such conditions when the operator would have difficulty in steering the truck solely by hand.

I claim:

1. In combination with the steering mechanism of a motor vehicle, including an oscillating lever between the steering wheel and the vehicle wheels, an auxiliary steering device comprising oppositely disposed air cylinders, plungers associated therewith and operable by air admitted to said cylinders, said plungers having connection with said oscillating lever, a source of compressed air, means connecting said source of air with said cylinders, a control valve for selectively controlling the action of the air on said plungers, means independent of the steering wheel for actuating said control valve, and means effective on the actuating means for automatically restoring the actuating means to neutral position after having operated the control valve.

2. In combination with the steering mechanism of a motor vehicle, an auxiliary pneumatic steering device including an air control valve, a pedal and a hand lever interconnected with the control valve whereby either may operate said control valve, and means for automatically restoring said control valve, pedal and hand lever to at rest position after operation of either pedal or hand lever.

3. In a motor vehicle, the combination with the front wheels thereof, of a steering device, comprising an actuating lever, a steering wheel and suitable mechanical connections between said steering wheel, lever and front wheels, a pneumatically operated plunger on each side of said lever and connected thereto, a source of compressed air, means for conducting said air to the plungers, a controlling valve for selectively controlling the action of the air on said plungers, and a rocking lever connected to said valve, said lever having a plurality of equalizing springs effective thereon for maintaining the lever in an invariable position when the controlling valve is closed.

CHRISTIAN J. HUG.